United States Patent
Greene et al.

(10) Patent No.: US 8,156,375 B1
(45) Date of Patent: *Apr. 10, 2012

(54) TECHNIQUES FOR EFFICIENT RESTORATION OF GRANULAR APPLICATION DATA

(75) Inventors: Christopher Greene, Longwood, FL (US); Derek D. Dickinson, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/884,901

(22) Filed: Sep. 17, 2010

Related U.S. Application Data

(63) Continuation of application No. 12/027,574, filed on Feb. 7, 2008, now Pat. No. 7,831,861.

(51) Int. Cl.
*G06F 11/00* (2006.01)
(52) U.S. Cl. .......................................... 714/15; 707/685
(58) Field of Classification Search .................. None
See application file for complete search history.

(56) References Cited

U.S. PATENT DOCUMENTS

| | | | |
|---|---|---|---|
| 6,016,553 A | 1/2000 | Schneider et al. | |
| 6,594,781 B1 | 7/2003 | Komasaka et al. | |
| 6,957,362 B2 | 10/2005 | Armangau | |
| 7,036,043 B2 | 4/2006 | Martin et al. | |
| 7,051,050 B2 | 5/2006 | Chen et al. | |
| 7,165,156 B1 | 1/2007 | Cameron et al. | |
| 7,437,603 B2 | 10/2008 | Ebata et al. | |
| 7,543,181 B2 | 6/2009 | Buxton et al. | |
| 7,546,428 B1 * | 6/2009 | McAndrews et al. | 711/161 |
| 7,653,612 B1 | 1/2010 | Veeraswamy et al. | |
| 7,716,183 B2 | 5/2010 | Lee | |
| 7,877,357 B1 * | 1/2011 | Wu et al. | 707/639 |
| 2004/0133575 A1 | 7/2004 | Farmer et al. | |
| 2004/0139128 A1 * | 7/2004 | Becker et al. | 707/204 |
| 2006/0155784 A1 | 7/2006 | Kusters et al. | |
| 2006/0179261 A1 | 8/2006 | Rajan | |
| 2008/0059542 A1 * | 3/2008 | Atluri et al. | 707/204 |

OTHER PUBLICATIONS

U.S. Appl. No. 11/967,667, filed Dec. 31, 2007.

* cited by examiner

*Primary Examiner* — Gabriel Chu
(74) *Attorney, Agent, or Firm* — Wilmer Cutler Pickering Hale and Dorr LLP

(57) ABSTRACT

Techniques for efficient restoration of granular application data are disclosed. In one particular exemplary embodiment, the techniques may be realized as a method for restoring one or more portions of application data comprising virtualizing one or more backup files of the application data into a specified staging area, running a recovery process for the one or more backup files, virtualizing the one or more backup files and the one or more recovery files, instantiating an instance of an application utilizing the virtualized one or more backup files and the virtualized one or more recovery files, and recovering one or more portions of the application data.

20 Claims, 4 Drawing Sheets

TECHNIQUES FOR EFFICIENT RESTORATION OF GRANULAR APPLICATION DATA

CROSS-REFERENCE TO RELATED APPLICATIONS

This patent application is a continuation of U.S. patent application Ser. No. 12/027,574, filed Feb. 7, 2008, which is hereby incorporated by reference herein in its entirety.

FIELD OF THE DISCLOSURE

The present disclosure relates generally to restoration of granular data and, more particularly, to techniques for efficient restoration of granular application data.

BACKGROUND OF THE DISCLOSURE

Restoring one or more portions of application data may require a data store to be recovered in order to restore the data. Recovery of a data store may involve ensuring that adequate space is available for one or more files of the data store. Duplication of the one or more files may require significant space and time. Running a recovery process may require writing transactions from one or more files, such as a log file, to a database being recovered. Thus, the recovery process may be time consuming as well. The recovery process may also require significant processing resources. Additionally, recovery processes may fail for one or more reasons.

A user wishing to restore one portion of application data may be required to address the above challenges in order to restore a file. The recovered application data store may be a secondary data store in addition to a data store utilized by a production instance. It may not be practical, cost efficient or even possible for a user to permanently allocate resources to maintain a recovered data store once the desired portions of data have been restored. An administrator or other user may thus eliminate a recovered data store after the desired portions of data have been restored. Subsequent to elimination of the recovered data store, the recovery of one or more secondary portions of data from the same backup files may be desired. This may require the recovery of the same data store again along with another associated delay and usage of resources.

In view of the foregoing, it may be understood that there are significant problems and shortcomings associated with current granular application data restoration technologies.

SUMMARY OF THE DISCLOSURE

Techniques for efficient restoration of granular application data are disclosed. In one particular exemplary embodiment, the techniques may be realized as a method for restoring one or more portions of application data. The method may comprise virtualizing one or more backup files of the application data into a specified staging area, and running a recovery process for the one or more backup files. The recovery process may include enabling recovery by writing recovery changes to one or more recovery files, wherein writing recovery changes to one or more recovery files allows the one or more backup files to remain unmodified. The recovery process may also include saving the one or more backup files and the one or more recovery files. The method may also comprise virtualizing the one or more backup files and the one or more recovery files, instantiating an instance of an application utilizing the virtualized one or more backup files and the virtualized one or more recovery files, and recovering one or more portions of the application data.

In another particular exemplary embodiment, the techniques may be realized as an article of manufacture for restoring one or more portions of application data, where the article of manufacture comprises at least one processor readable carrier, and instructions carried on the at least one carrier. The instructions may be configured to be readable from the at least one carrier by at least one processor and thereby cause the at least one processor to operate so as to virtualize one or more backup files of the application data into a specified staging area, and run a recovery process for the one or more backup files. The recovery process may include enabling recovery by writing recovery changes to one or more recovery files, wherein writing recovery changes to one or more recovery files allows the one or more backup files to remain unmodified. The recovery process may also include saving the one or more backup files and the one or more recovery files. The instructions may also be configured to cause the at least one processor to operate so as to virtualize the one or more backup files and the one or more recovery files, instantiate an instance of an application utilizing the virtualized one or more backup files and the virtualized one or more recovery files, and recover one or more portions of the application data.

In yet another particular exemplary embodiment, the techniques may be realized as a system for restoring one or more portions of application data comprising one or more processors communicatively coupled to a server. The server may be configured to virtualize one or more backup files of the application data into a specified staging area, and run a recovery process for the one or more backup files. The recovery process may include enabling recovery by writing recovery changes to one or more recovery files, wherein writing recovery changes to one or more recovery files allows the one or more backup files to remain unmodified. The recovery process may also include saving the one or more backup files and the one or more recovery files. The server may also be configured to virtualize the one or more backup files and the one or more recovery files, instantiate an instance of an application utilizing the virtualized one or more backup files and the virtualized one or more recovery files, and recover one or more portions of the application data.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
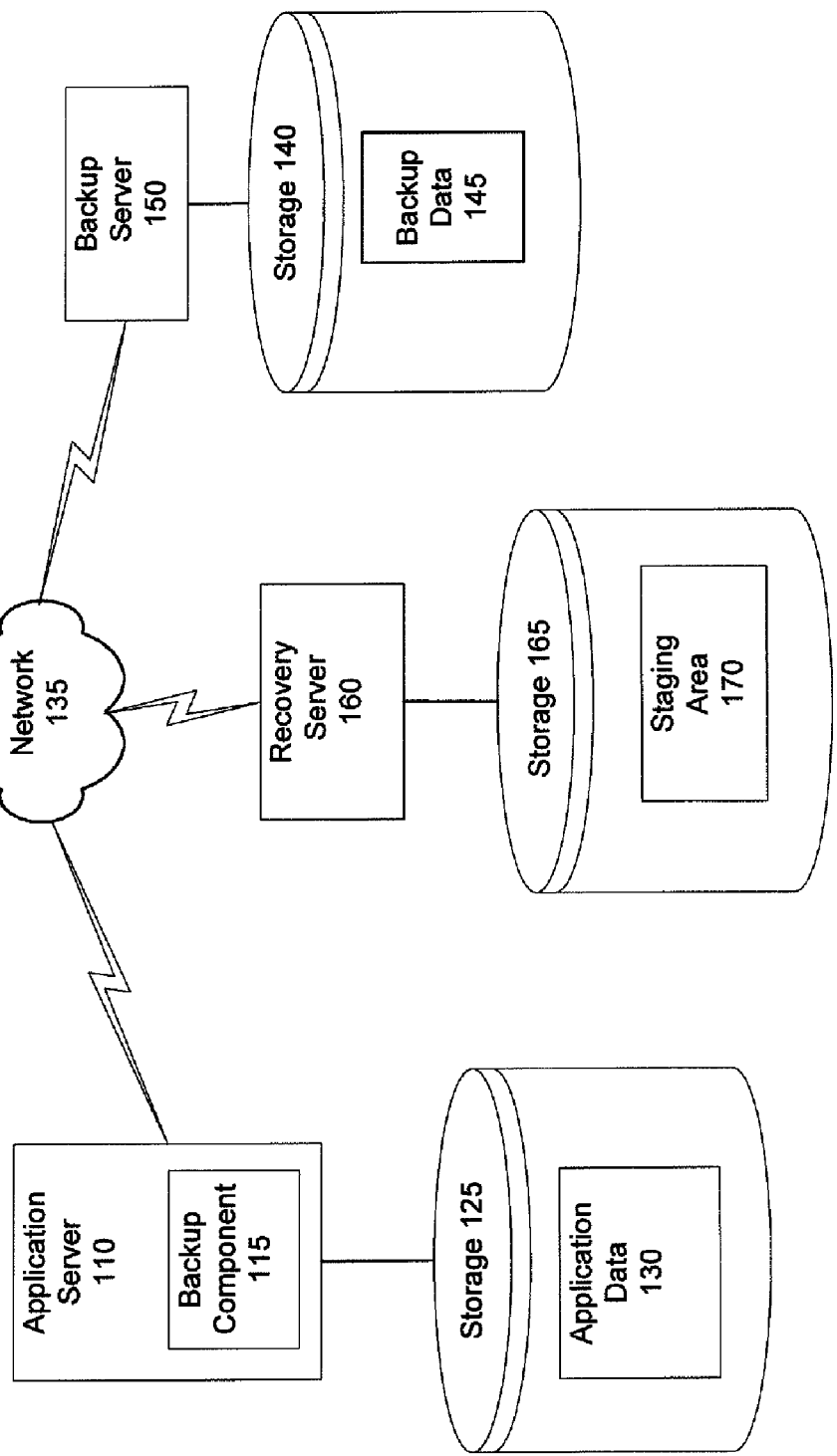
FIG. 1 shows a system for the restoration of granular data in accordance with an embodiment of the present disclosure.

Referring to FIG. 1, there is shown a system 100 for the restoration of granular data in accordance with an embodiment of the present disclosure. Application server 110 may be a server hosting one or more applications. Backup component 115 may facilitate backup of application server 110. Application server 110 may be communicatively coupled to storage 125. Storage 125 may be storage that may be utilized by application server 110 to store application data 130, or other data associated with application server 110 or backup component 115. Application server 110 may be communicatively coupled to network 135. One or more additional devices may be communicatively coupled to network 135, such as backup server 150 and recovery server 160. Backup server 150 may be communicatively coupled to storage 140. Storage 140 may contain backup data 145. Recovery server 160 may be communicatively coupled to storage 165. Storage 165 may contain staging area 170.

Application server 110 may be a server, a laptop, or other computer capable of supporting one or more applications. Applications may include, for example, Microsoft Exchange™, other email applications, workgroup applications, file sharing applications, and other applications enabling the creation of application data. Application server 110 may enable a user to create application data such as, for example, an email, a document, a list, an image file, a posting, a web page, xml data, a sound file, and a video file, or other application data. Application server 110 may utilize platforms or storage mechanisms such as databases or file systems which may utilize storage 125.

Backup component 115 may be a backup process, job, device or mechanism utilized to ensure one or more portions of application data is backed up. In some, embodiments, backup component 115 may be an input/output (I/O) redirector, a splitter or another device or process utilized to replicate transactions directed to storage 125 to one or more secondary storage devices. Backup component 115 may enable snapshots of backup data, exporting of backup data, the running of backup jobs and other processes ensuring data backup and integrity.

Storage 125, 140, and 165 may be local, remote, or a combination thereof to application server 110. Storage 125, 140, and 165 may utilize a redundant array of inexpensive disks (RAID), a redundant array of inexpensive nodes (RAIN), tape, disk, a storage area network (SAN), or other computer accessible storage. Storage 125 may contain application data 130.

Application data 130 may include data written by one or more applications hosted by application server 110. Application data 130 may contain one or more user created data files such as, for example, a document, a list, an image file, an email, a posting, a web page, xml data, a sound file, and a video file. Application data may be stored in one or more formats or data structures. Data structures may be determined by an underlying platform or system supporting an application.

Network 135 may be a local area network (LAN), a wide area network (WAN), the Internet, a cellular network, a satellite network, or other networks that permit communication between application server 110 and other devices operatively connected to network 135, such as recovery server 160 and backup server 150.

Backup server 150 may process one or more backup requests and may provide backup services to one or more hosts, such as, for example, application server 110. Backup server 150 may utilize storage 140 for backup data 145. Backup data 145 may contain logs, files, or other data structures containing backed up application data. Backup data 145 may also contain recovery files which may be delta files containing changes that would be written to an application data store or a database during recovery. Backup data 145 may also contain exported data of a backup target. For example, backup data 145 may contain one or more exported snapshots of data associated with application server 110, such as snapshots of application data 130. The one or more exported snapshots may appear as local disks to backup server 150. In some embodiments, application data, such as snapshots of application data 130, may be exported to storage associated with a separate device for recovery, such as storage 165. In some embodiments, backup images of application data may be exposed to a backup server 150 as a shared resource.

Storage 140 may host a staging area for recovery, and backup server 150 may run a recovery process. In other embodiments, a recovery process may be run on recovery server 160.

Recovery server 160 may be a separate device, such as a server, from application server 110. Recovery server 160 may enable a backup server or an application server to avoid the processing burden that may be associated with recovery. In one or more embodiments, recovery server 160 may be a process and may run on application server 110 or on one or more additional servers or devices. Recovery server 160 may utilize storage 165 to host staging area 170. Recovery server 160 may enable the running of one or more recovery processes and the instantiation of an application utilizing a recovered data store.

Staging area 170 may represent storage space utilized for the recovery of one or more application data stores. Staging area 170 may facilitate the restoration of application data stores, such as databases. Staging area 170 may enable an application server or a backup server to avoid the burden associated with storing one or more data files for the restoration of a data store.

Figure 2:
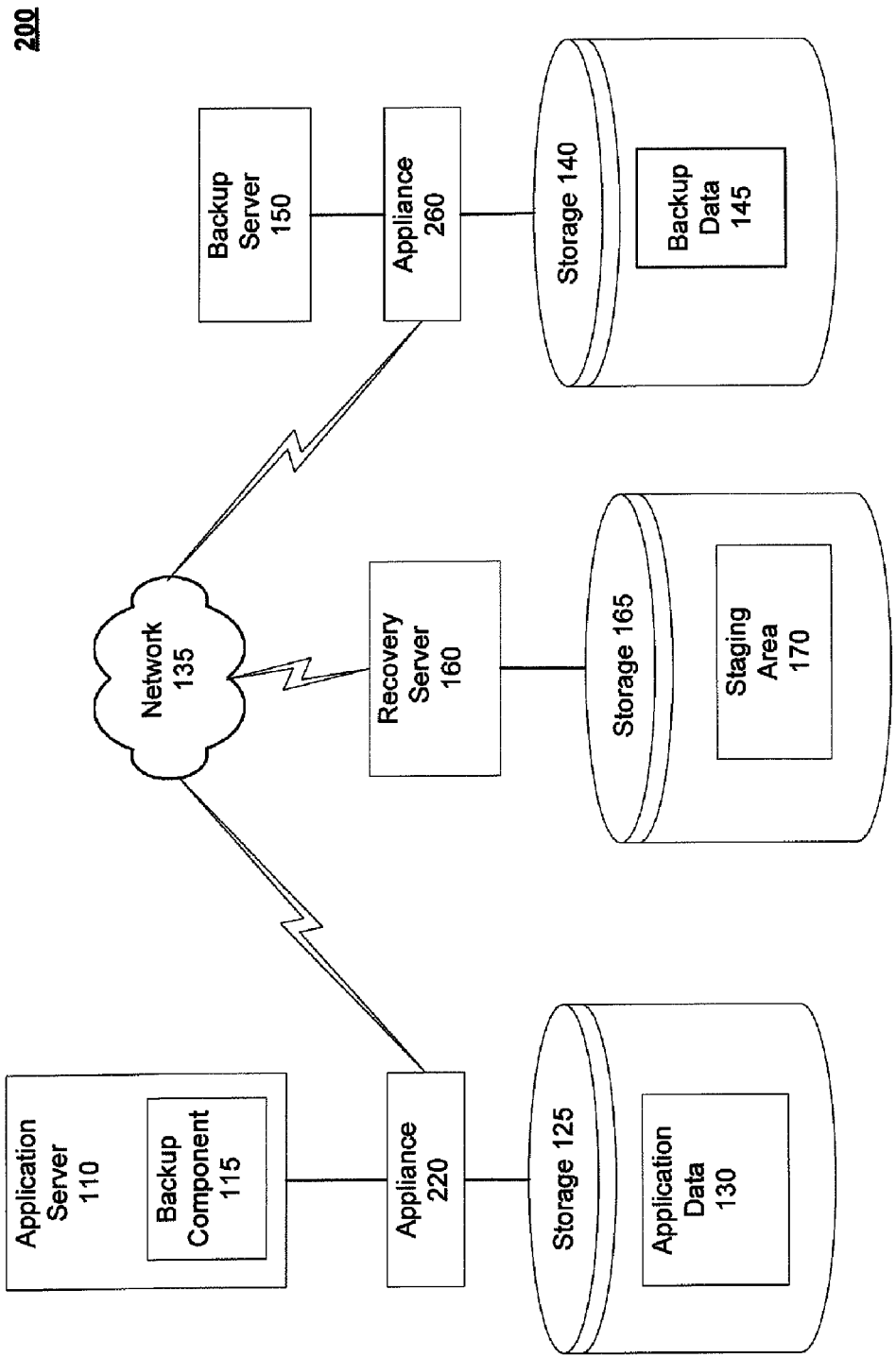
FIG. 2 shows a system for the restoration of granular data contained in a continuous data protection environment in accordance with an embodiment of the present disclosure.

Referring to FIG. 2, there is shown a system 200 for the restoration of granular data contained in a continuous data protection environment in accordance with an embodiment of the present disclosure. FIG. 2 is a simplified view of system 200 and may include additional elements that are not depicted. As illustrated, FIG. 2 may contain many of the same elements as discussed in reference to FIG. 1, including application server 110, backup component 115, storage 125, application data 130, network 135, recovery server 160, storage 165, staging area 170, backup server 150, storage 140, and backup data 145. FIG. 2 may additionally include appliance 220 and appliance 260.

Appliances 220 and 260 may be continuous data protection and replication (CDP/R) devices which may provide continuous data protection and replication (CDP/R) services to application server 110. CDP/R services may be provided through the use of a network switch or may be provided through a continuous data protection and replication appliance. In one or more embodiments, appliances 220 and 260 may be network switches providing CDP/R services to application server 110. Appliances 220 and 260 may be communicatively coupled to storage 125 and 140, which may be storage area networks (SAN).

In one or more embodiments, storage 125 and 140 may represent storage area networks (SAN), internet small computer systems interface (iSCSI) SANs, Fiber Channel SANs, common Internet File Systems (CIFS) or network file systems (NFS).

Figure 3:
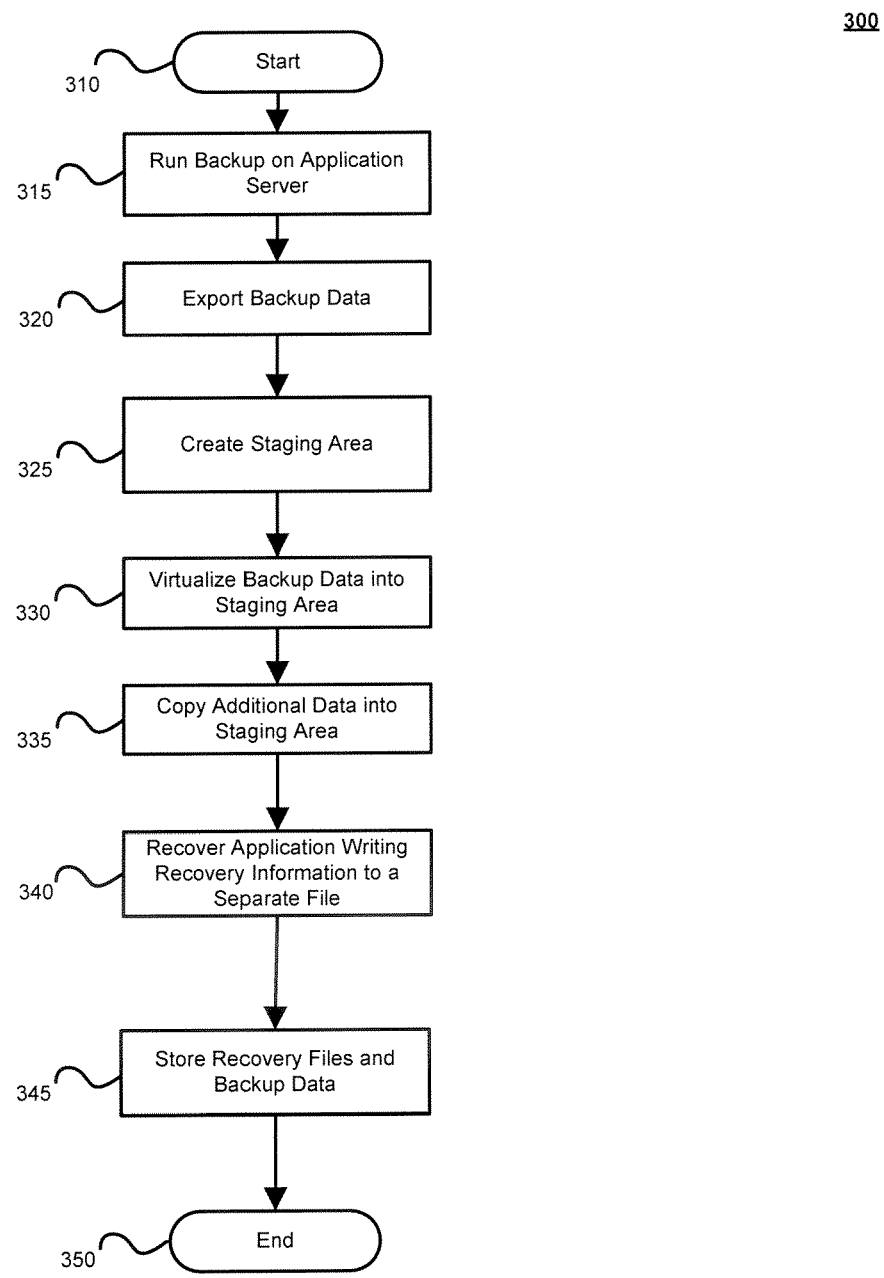
FIG. 3 shows a method for storing data to enable the restoration of granular data in accordance with an embodiment of the present disclosure.

Referring to FIG. 3, there is shown a method 300 for storing data to enable the restoration of granular application data in accordance with an embodiment of the present disclosure. At block 310, the method 300 for storing application data to enable the restoration of granular data may begin.

At block 315, a backup may be run on an application server. For example, in reference to FIG. 1, a snapshot may be taken by backup component 115 of one or more portions of application data 130. In one or more embodiments, a full backup may be taken of one or more portions of storage associated with a continuous data protection device providing CDP services to an application server.

At block 320, the backup data may be exported to a backup server enabling the data to appear as local to the backup server, such as backup server 150. In one or more embodiments, backup images may be exposed to the backup server, such as backup server 150, as a shared resource. In embodiments wherein data is exported or exposed to the backup server, a staging area may be created on the backup server. In some embodiments, data may be exported or exposed to a server which may be utilized for recovery, such as recovery server 160.

At block 325, a staging area may be created. The staging area, such as staging area 170, may be created on a backup server or another server. The location of the staging area may be determined by the availability of storage, processing capability, and the presence of one or more portions of a data store to be recovered. For example, if storage 140 has adequate space and already contains a majority of the data store to be recovered, such as multiple log files, the staging area may be created on storage 140. Recovery may be performed by a server which may be associated with the storage of the staging area, such as backup server 150 for staging areas created on storage 140.

At block 330, backup data may be virtualized into a staging area. Prior to virtualization the method 300 may determine if a backup file to be virtualized is on the same volume as the staging area. If a backup file is on the same volume as the volume of the staging area, the virtualization process may hard link the file into the specified staging area. If the backup file to be virtualized is on a separate volume from the volume of the staging area the backup file may be virtually linked into the specified staging area.

At block 335, additional data may be copied into a staging area. For example, a current log file and a last log file of an application data store to be recovered may be copied into a specified staging area. In one or more embodiments, one or more log files, journal files, and/or files tracking uncommitted modifications to application data may be copied into a staging area.

At block 340, a recovery process may begin and may utilize one or more files and/or virtualized files present in the specified staging area. The recovery process may utilize a file filter which may enable recovery to avoid modification of backup files and may write recovery data to one or more recovery files. A file filter may enable virtualization of one or more portions of a file system. A file filter may intercept one or more file system requests and may enable the requests to be redirected to other file system locations and/or files. For example, a recovery process may use a modified virtual file filter driver which may read one or more uncommitted transactions in one or more log files and may write the desired database updates to one or more recovery files as metadata. This may enable a recovery process to run and to write updates and/or transactions to a recovery file instead of a database file.

At block 345, the recovery files and the backup data may be stored. In one or more embodiments, the backup data may be stored as metadata and it may be part of a backup set. The storage of recovery files may enable one or more instantiations of an application associated with the backup data to utilize the recovery files and the data files. The stored recovery files may thus enable an application to be started or a database to be mounted utilizing the one or more recovery files as explained in reference to FIG. 4 below.

At block 350, the method 300 may end.

Figure 4:
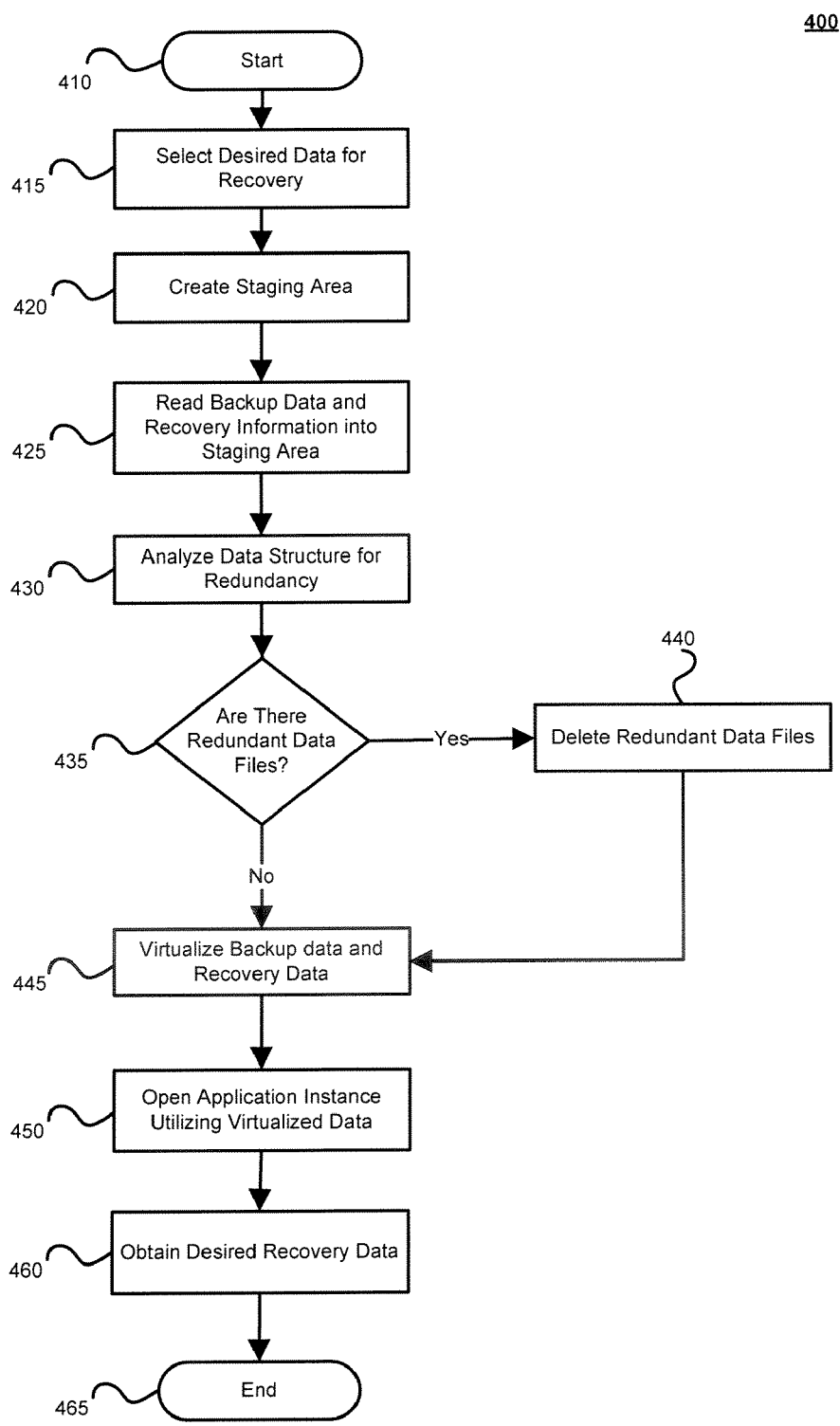
FIG. 4 shows a method for restoration of granular data in accordance with an embodiment of the present disclosure.

Referring to FIG. 4, there is shown a method 400 for restoration of granular application data in accordance with an embodiment of the present disclosure. At block 410, the method 400 for restoration of granular application data may begin.

At block 415, a user may browse one or more data items of a backup data set and may specify one or more items for restoration.

At block 420, a temporary staging area is created. In some embodiments, an existing temporary staging area may be specified. The temporary staging area may be located on a backup server, a recovery server or another platform with adequate resources for the recovery process.

At block 425, backup data and recovery information may be placed or read into the staging area. Backup data may include database files, log files, data store files, check files, and/or recovery files.

At block 430, the data structure of one or more data files may be analyzed for redundancy. For example, a last log file and a current log file of a database backup may be compared. The log files may contain a sequence number, a generation indicator or another indicator.

At block 435, the method 400 may determine if the sequence, generation number, or other indicator of the data files are identical. If they are, method 400 may continue at block 440. If the indicators are different the method may continue at block 445.

At block 440, if the sequence numbers, generation indicator, or other indicators contain the same number, one of the data files, such as the last log file, may be deleted.

At block 445, the backup data and the recovery files may be virtualized. Virtualizing the one or more backup data and/or the one or more recovery files may emulate a recovered data store. In one or more embodiments, virtualization may utilize a virtual file filter driver.

At block 450, virtualization of the one or more portions of backup data and/or the one or more recovery files may enable running of an application utilizing the data store. The application may behave as if the data store had been fully recovered and the virtualization may enable the instantiation and use of one or more applications utilizing the data store.

At block 460, one or more users may obtain desired data from the application. The data desired for recovery may then be read, transferred, or otherwise provided to a production instance, to user specified storage, or to another output.

At block 465, the method 400 may end.

At this point it should be noted that the efficient restoration of granular data in accordance with the present disclosure as described above typically involves the processing of input data and the generation of output data to some extent. This input data processing and output data generation may be implemented in hardware or software. For example, specific electronic components may be employed in an application specific electronic circuit or similar or related circuitry for implementing the functions associated with efficient restoration of granular data in accordance with the present disclosure as described above. Alternatively, one or more processors operating in accordance with stored instructions may implement the functions associated with the efficient restoration of granular data in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for restoring one or more portions of application data comprising:
    virtualizing one or more backup files of the application data into a specified staging area, wherein virtualizing one or more backup files of the application data into a specified staging location comprises virtually linking the one or more backup files into the specified staging area in the event that the one or more backup files to be virtually linked are determined to be on a volume different from the volume of the specified staging area;
    running a recovery process for the one or more backup files wherein the recovery process includes:
        enabling recovery by writing recovery changes to one or more recovery files, wherein writing recovery changes to one or more recovery files allows the one or more backup files to remain unmodified; and
        saving the one or more backup files and the one or more recovery files;
    virtualizing the one or more backup files and the one or more recovery files;
    instantiating an instance of an application utilizing the virtualized one or more backup files and the virtualized one or more recovery files; and
    recovering one or more portions of the application data;
    wherein the one or more backup files comprise snapshots of an application server which are provided to a backup server.

2. The method of claim 1, wherein virtualizing the one or more backup files and the one or more recovery files emulates a recovered data store and enables running of an application utilizing the data store.

3. The method of claim 2, wherein the emulation of a recovered data store enables subsequent restorations of data from the data store.

4. The method of claim 2, further comprising:
    providing one or more files for the recovery process to the specified staging area, wherein providing one or more files for a recovery process to the specified staging area comprises providing at least one of: a current log and a last log.

5. The method of claim 4, further comprising:
    comparing a current log and a last log prior to virtualization, and
    removing the last log in the event that the current log and the last log are redundant.

6. The method of claim 1 further comprising:
    performing a full backup;
    exporting backup data; and
    creating the specified staging area.

7. The method of claim 1, wherein the staging area is on at least one of: a backup server and a third server.

8. The method of claim 1, wherein the one or more backup files comprising snapshots of the application server are provided to the backup server by at least one of: exporting the one or more backup files to the backup server and exposing the one or more backup files as a shared resource.

9. The method of claim 1, wherein the one or more backup files are created by performing a full backup of one or more devices enabling continuous data protection of the application data.

10. The method of claim 1, further comprising providing one or more files into the specified staging area, wherein the one or more files provided into the specified staging area comprise at least one of: a log file, a journal file, and a file tracking uncommitted modifications to application data.

11. The method of claim 1, wherein virtualizing one or more backup files of the application data into a specified staging location comprises:
    determining a current location of the one or more backup files; and
    hard linking the one or more backup files into the specified staging area in the event that the one or more backup files to be hard linked are determined to be on a volume of the specified staging area.

12. At least one non-transitory processor readable storage medium for storing a computer program of instructions configured to be readable by at least one processor for instructing the at least one processor to execute a computer process for performing the method as recited in claim 1.

13. An article of manufacture for restoring one or more of application data, the article of manufacture comprising:
    at least one non-transitory processor readable storage medium; and
    instructions carried on the at least one medium;
    wherein the instructions are configured to be readable from the at least one medium by at least one processor and thereby cause the at least one processor to operate so as to:
    virtualize one or more backup files of the application data into a specified staging area, wherein virtualizing one or more backup files of the application data into a specified staging location comprises virtually linking the one or more backup files into the specified staging area in the event that the one or more backup files to be virtually linked are determined to be on a volume different from the volume of the specified staging area;
    run a recovery process for the one or more backup files wherein the recovery process includes:

enabling recovery by writing recovery changes to one or more recovery files, wherein writing recovery changes to one or more recovery files allows the one or more backup files to remain unmodified; and saving the one or more backup files and the one or more recovery files;

virtualize the one or more backup files and the one or more recovery files;

instantiate an instance of an application utilizing the virtualized one or more backup files and the virtualized one or more recovery files; and recover one or more portions of the application data;

wherein the one or more backup files comprise snapshots of an application server which are provided to a backup server.

14. A system for restoring one or more portions of application data comprising:

one or more processors communicatively coupled to a server; wherein the server is configured to:

virtualize one or more backup files of the application data into a specified staging area, wherein virtualizing one or more backup files of the application data into a specified staging location comprises virtually linking the one or more backup files into the specified staging area in the event that the one or more backup files to be virtually linked are determined to be on a volume different from the volume of the specified staging area;

run a recovery process for the one or more backup files wherein the recovery process includes:

enabling recovery by writing recovery changes to one or more recovery files, wherein writing recovery changes to one or more recovery files allows the one or more backup files to remain unmodified; and saving the one or more backup files and the one or more recovery files;

virtualize the one or more backup files and the one or more recovery files;

instantiate an instance of an application utilizing the virtualized one or more backup files and the virtualized one or more recovery files; and recover one or more portions of the application data; wherein the one or more backup files comprise snapshots of an application server which are provided to a backup server.

15. The system of claim 14, wherein virtualizing the one or more backup files and the one or more recovery files emulates a recovered data store and enables running of an application utilizing the data store.

16. The system of claim 15, wherein the emulation of a recovered data store enables subsequent restorations of data from the data store.

17. The system of claim 15, wherein the server is further configured to:

provide one or more files for a recovery process to the specified staging area, wherein providing one or more files for the recovery process to the specified staging area comprises providing at least one of: a current log and a last log.

18. The system of claim 17, further comprising:

comparing a current log and a last log prior to virtualization, and removing the last log in the event that the current log and the last log are redundant.

19. The system of claim 14, wherein the staging area is on at least one of: a backup server and a third server.

20. The system of claim 14, wherein the one or more backup files comprising snapshots of the application server are provided to the backup server by at least one of: exporting the one or more backup files to the backup server and exposing the one or more backup files as a shared resource.

* * * * *